Sept. 16, 1952 G. W. PENNEY ET AL 2,610,699
ELECTROSTATIC AIR-CLEANING SYSTEM
Filed April 1, 1948 4 Sheets-Sheet 1

WITNESSES:
Robert C. Baird
Nw. La Groome

INVENTORS
Gaylord W. Penney and
George W. Hewitt.
BY B. L. Zangwill
ATTORNEY

Sept. 16, 1952 G. W. PENNEY ET AL 2,610,699
ELECTROSTATIC AIR-CLEANING SYSTEM
Filed April 1, 1948 4 Sheets-Sheet 2

WITNESSES:
Robert C. Baird
Nw. C. Groome

INVENTORS
Gaylord W. Penney and
George W. Hewitt.
BY
B. P. Zangwill
ATTORNEY

Sept. 16, 1952 G. W. PENNEY ET AL 2,610,699
ELECTROSTATIC AIR-CLEANING SYSTEM
Filed April 1, 1948 4 Sheets-Sheet 3
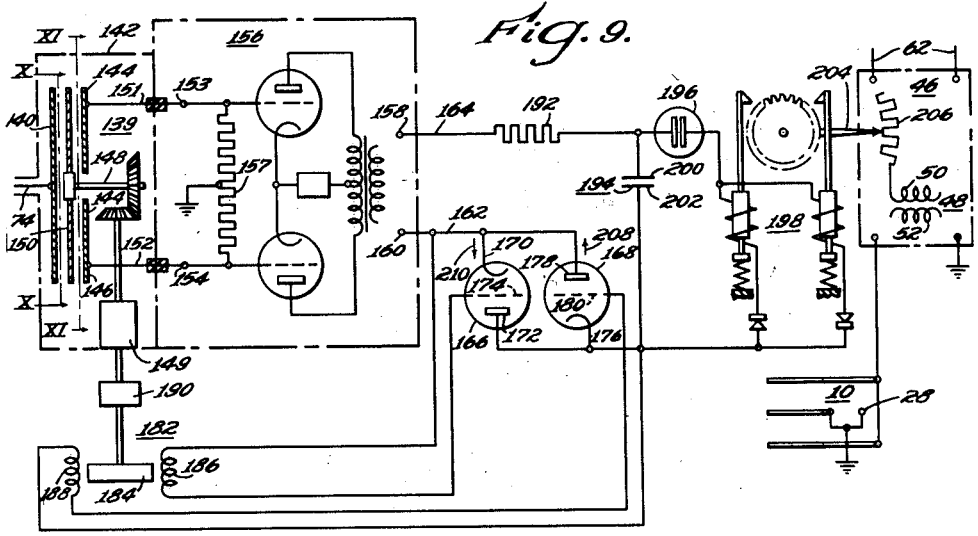
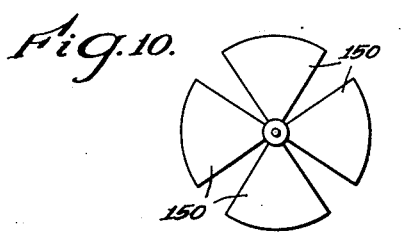
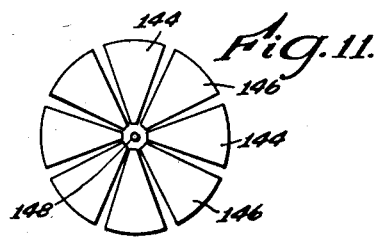
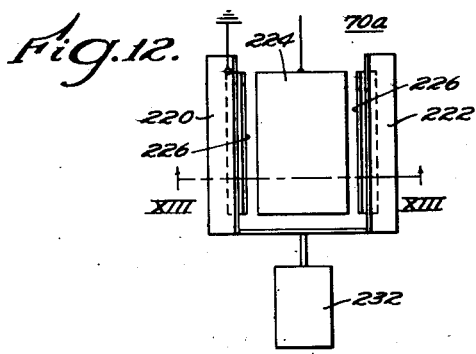
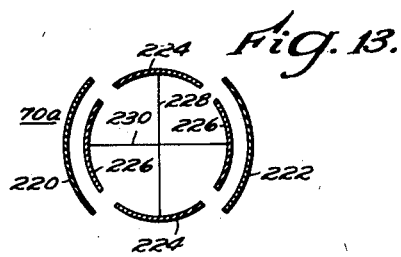
WITNESSES:
Robert C. Baird
Nw. C. Groome
INVENTORS
Gaylord W. Penney and
George W. Hewitt.
BY
B. L. Zauguill
ATTORNEY

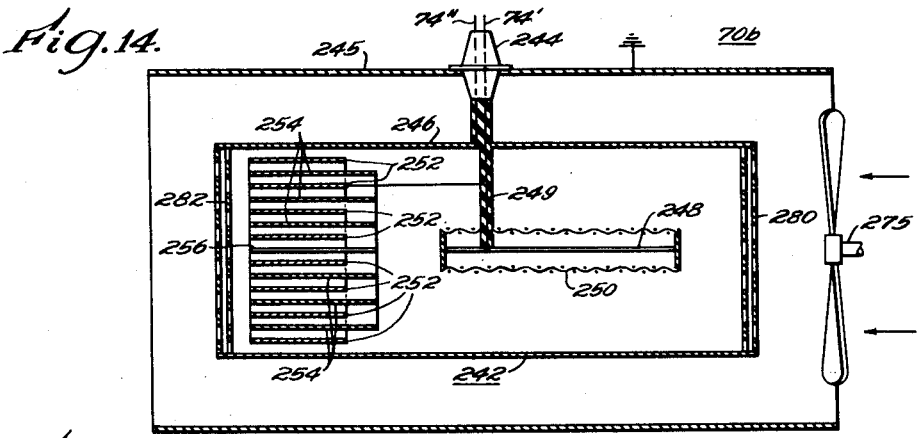
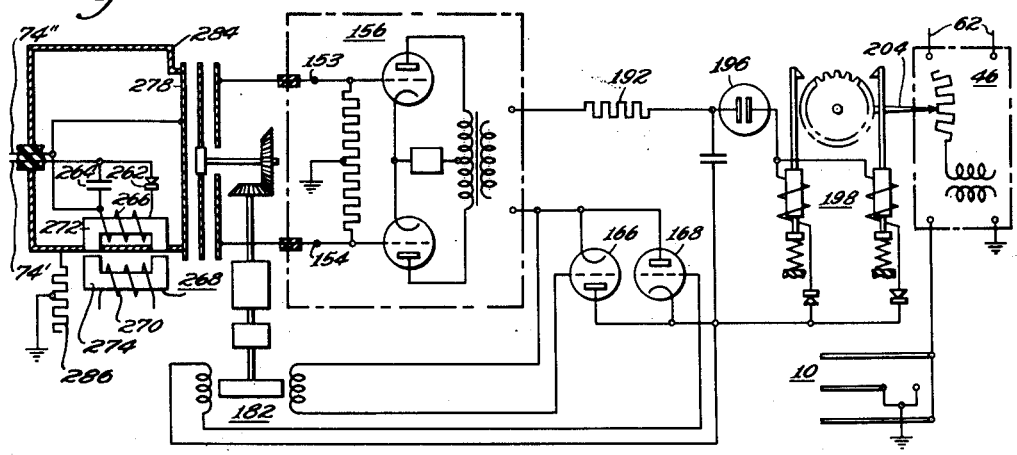
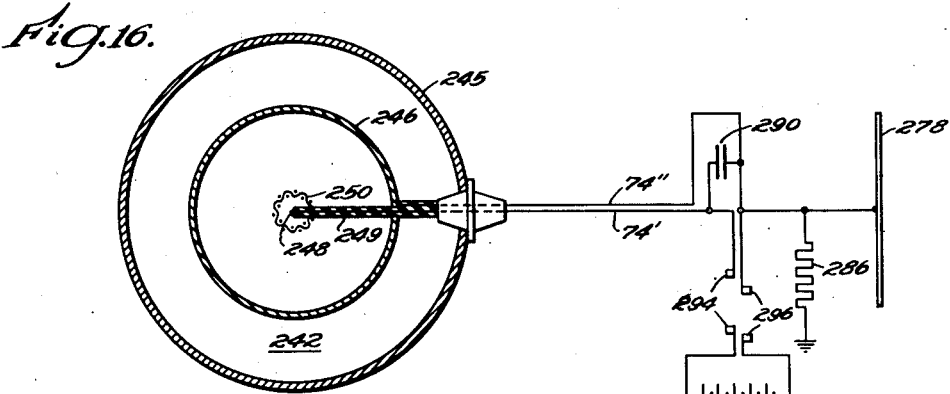

Patented Sept. 16, 1952

2,610,699

UNITED STATES PATENT OFFICE 2,610,699

ELECTROSTATIC AIR-CLEANING SYSTEM

Gaylord W. Penney and George W. Hewitt, Pittsburgh, Pa., assignors to Westinghouse Electric Corporation, East Pittsburgh, Pa., a corporation of Pennsylvania Application April 1, 1948, Serial No. 18,334

19 Claims. (Cl. 183—7)

This invention is especially directed to improvements in electrostatic air-cleaning systems for supplying a room or enclosure with electrostatically cleaned air that is electrically substantially neutral; but the invention has broader aspects.

Under particular circumstances, such as described in the Penney Patent No. 2,318,093 of May 4, 1943, electrostatically cleaned air may carry a residue of electrically charged particulate matter. The particles which carry the electric charges are fine dust particles, using the term "dust" broadly to designate any foreign particulate matter found in the air. When air, containing charged or electrified particles, is supplied to an enclosure, such as a room, hall, auditorium, store, etc., the electrified particles permeate the atmosphere of the enclosure and produce a space charge.

The space charge which the electrified particles create results in an electric field inside the enclosure, having field lines which terminate on or extend to exposed surfaces in the enclosure, such as walls, draperies, lamp fixtures, columns, etc. The field reacts on the suspended electrified particles in a manner tending to drive them to such surfaces, the electric force on the particles being in the direction of the field lines. Accordingly, although the air in an enclosure is actually much cleaner than it would have been if the air had not been electrostatically cleaned, an excessive space charge in the enclosure forces the fewer electrified dust-particles remaining in the cleaned air to an exposed surface at an accelerated rate, and the surfaces may become discolored at an accelerated rate. This electrical "dirtying" effect can be particularly serious in large enclosures.

Space charge in an enclosure is built up by the electrified dust-particles introduced into the space, and is limited by the rate at which electrified dust-particles escape from the space and by the rate at which they are relieved of their charges, either by contacting a grounded surface or otherwise. Hence the introduction of electrified dust-particles into an enclosure with electrostatically cleaned air is not objectionable so long as the rate is such that the potentials and the field gradients of the space charge are not raised above a desired value. In other words, by keeping the space charge in the enclosure at or below a tolerable limit or within an innocuous range, the electrical discoloration or dirtying effect upon exposed surfaces can be made insignificant or unobjectionable. An absolute zero net space charge in the enclosure need not be the criterion for satisfactory operation of the air-cleaning means for the enclosure. The space charge can be considered objectionable when the electrified dust-particles in the air fed to the enclosure or in the air leaving the electrostatic air-cleaning means therefor, are so great in number as to cause exposed surfaces to become dirty too soon.

In the lack of standardized procedure and requirements, it is difficult to state the exact space charge potential or field gradient which would be acceptable for an enclosure, i. e., a value of the potential or the field gradient of a space charge at which the electrostatic dirtying effect on exposed surfaces is not noticeably greater than the dirtying caused by other effects, such as thermal precipitation and settling. In general, we have found that the field gradient at an exposed surface, due to space charge, is a more general measure of the dirtying effect than the space charge potential. However, for a particular enclosure, the field gradient and potential are mathematically related so that a measure of either is an indication of the dirtying effect in such enclosure.

For a given enclosure, the magnitude of the space charge depends on the geometry of the enclosure and on the charge density in the space within the enclosure. Theoretically, the maximum potential of the space charge in a square prismatic enclosure can be approximated by the formula $$P = k\pi \zeta h^2$$

where $P$ is the maximum space charge potential in statvolts, usually found at the center of an enclosure, $\zeta$ is the charge density expressed in statcoulombs per cubic centimeter of air in the enclosure, $h$ is a side of the enclosure, $\pi$ is the customary number 3.1416, and $k$ is a constant depending on the height of the enclosure as compared to its length. For a cubic room $k$ is approximately .19, and for a low square room having a side considerably greater than its height, $k$ is about .5.

The potentials at different points in an enclosure having a space charge are graded from a maximum value at a point in the enclosed space to a value at a grounded point or at a surface point. Theoretically, the resulting field gradient, $E$ in volts per centimeter, at an exposed surface can be approximated by the formula $$E = k'\pi\zeta d + M$$

where $d$ is the distance from the center of the enclosure to the exposed surface, and $k'$ and $M$ are factors or functions depending on the configuration, size and contents of the enclosure. For a low square room of large expanse, the field gradient at a wall of the room which is a distance $n$ from the center of the room is $E=4\pi\zeta n$. For a spherical room $$E = \frac{4}{3}\pi\zeta n$$

In general, the larger the enclosure the higher the field gradient will be at a wall of the enclosure.

The electrostatic air-cleaning systems disclosed in aforesaid Penney Patent No. 2,318,093 limit the "dirtying" effect by limiting the space charge that can build up in the enclosure. A specific system, shown in Fig. 5 of this patent, consists of an air-cleaning means comprising a main multizone electrostatic dust-precipitator of more or less conventional design, and an auxiliary ion-source which has been called a neutralizer. The neutralizer causes some of the dust-particles passing to the enclosure to become electrically charged with a potential-polarity opposite to that on the dust-particles passing directly from the main electrostatic dust-precipitator to the enclosure. If the positive charges on dust-particles substantially balance the negative charges on dust-particles, the net effect is to keep down the overall space charge in the enclosure. However, in such apparatus a change in the operating conditions of the main dust-precipitator without a compensating change in the operating conditions in the neutralizer will upset the charge-balance.

An overall object of our invention is the provision of a more complete electrostatic air-cleaning system in which the possible electrical dirtying effect of electrostatically cleaned air is automatically minimized.

A broad object of our invention is to inhibit the building-up of space charge in an enclosure supplied with air which has been electrostatically cleaned by providing additional equipment which monitors the air-cleaning means so that the electric charges in the air leaving the air-cleaning means are substantially in balance electrically.

A further broad object of our invention is to provide another approach for inhibiting space charge, which involves means for removing electric charges from the air after it leaves an air-cleaning means.

A more specific object of our invention is to improve upon systems such as shown in the aforesaid Penney Patent No. 2,318,093 of May 4, 1943, by providing them with equipment which alters the voltages between the electrodes of the neutralizer so that it will continually tend to yield only enough electric charges to keep the space charge in an enclosure down to reasonable values.

For achieving the last-mentioned objective of our invention, in connection with an air-cleaning means using a neutralizer, we determine the several important factors or conditions which affect the main dust-precipitator or the neutralizer, or both, of the air-cleaning means. A change in any one of these factors is usually detrimental to any preset charge-balance in the cleaned air provided by the neutralizer and main air-cleaning dust-precipitator. In accordance with our invention, these factors are divided into two groups. In the first group are the factors which can be readily and quickly individually measured or controlled. In the second group are those which usually change gradually and erratically, and are not readily measurable or controllable. The factors of the first group are kept close to the desired operating magnitudes so that they have no overall disturbing effect on charge-balance; and those of the second group are permitted to change as they will, but their effects on the space charge are counterbalanced or offset.

In accordance with our invention, the factors for the first group are controlled directly by a regulating means. The factors are adjusted to an original operating setting; and any tendency of the factors to change from such setting automatically sets the regulating means into operation for restoring the original setting. However, the factors in the second group can not be so regulated. Hence we provide a means which makes a corrective action on some operating part that also has an influence on space charge. In other words, the factors of the second group are not themselves automatically varied by the control apparatus. Instead the manifestation which they produce on the potential of the spaced charge, or on the field-gradient at a point in the enclosure, or on the net electric charge in the air supplied to the enclosure is used to readjust a neutralizer to some different setting.

We have found that the variable factors in the first group which in practice require a regulating means can be confined to the voltages on the commercial power lines which supply the voltage-conversion means or power-pack of an air-cleaning means with energy. A change in the high voltage supply to the air-cleaning means seriously and differently affects the magnitudes of the currents discharged from the ionizing wires in the main dust-precipitator and in the charge-neutralizer of the air-cleaning means. The reasons for this are several, but in general it is sufficient to point out that even in ionizing means of identical geometrical arrangements, positive ionization from a wire is less than negative ionization from the same wire under the same voltage. Additionally, the discharge-current from an ionizing wire does not vary linearly with voltage.

Fortunately, satisfactory and quick-acting voltage regulators for low voltages are common so that, in accordance with our invention, we provide such a regulator on the low voltage side of the voltage-converter or power-pack. Such regulators can keep the voltage at the ionizing wires close to a predetermined constant value in spite of frequent and much greater variations of the voltage on the main power line. Hence, the use of a suitable regulator minimizes charge-disturbances in the air for or in an enclosure, which are caused by line voltage fluctuations.

We have also found that the primary factors of the second group which affect the amount of charged matter coming from the main dust-precipitator and the charge-neutralizer are: (a) the dust concentration in the air entering the electrostatic air-cleaning means, and (b) the cleaning efficiency of the main dust-precipitator. The latter is dependent upon many other things, such as back-ionization, the thickness of the layers of dirt on the electrified parts of the main dust-precipitator, the kind and character of dirt collected, the amount of charged dust-particles that are not electrostatically precipitated, the velocity of the air being cleaned, etc.

In systems, such as those shown in Fig. 5 of the aforesaid Penney Patent No. 2,318,093, the neutralizer is on the cleaned air side of the main dust-precipitator so that it is not significantly subject to the factors of the second group. In other systems such as that shown in Fig. 3 of said patent, the likelihood of these factors being the same for positive and negative ionization of the two main dust-precipitators is small. In any event, in accordance with our invention, the electrical charge-effect which is produced by changes in the factors of the second group in the main dust-precipitator, is offset by adjusting operations on the neutralizing equipment. The offsetting adjustments are made under the supervision of a sensing means or detector which is continually responsive to the extent to which the cleaned air is electrically charged.

A charge-detector can be provided to respond to different characteristics which accompany an existing space charge or which would cause a space charge to build up. For example, the charge-detector can be such as to follow the potential at a point in the space of an enclosure, and such a charge-detector would be a potential charge-detector. Or it can be such as to respond to the field-gradient in the space and would be a field-gradient charge-detector. Or it can be such as to respond to the charge density in moving air, such as the electrostatically cleaned air being fed to the enclosure, and hence in a sense would be a current-responsive charge-detector. The quantity measured by the charge-detector, after such amplification as may be necessary, is used to control equipment that adjusts the ionizing-means of the electrostatic air-cleaning means in a manner to produce whatever alteration in the ionization that the measurement calls for.

It is to be observed that we use the word "change" in connection with variations in the factors of the first group and the uncontrollable factors of the second group which cause the balance of positive and negative charges to be disturbed; and that we use the word "adjustment" in connection with variations in the setting of parts of the air-cleaning system, which are made for restoring the charge-balance.

More details, objects, features, methods and innovations of our invention will be discernible from the following description which is to be taken in connection with the accompanying symbolic drawings. An attempt has been made to limit the showing and illustrations to such major parts as will make the invention evident to those skilled in the art without excessive or unnecessary description and illustration of details.

In the drawings which are not to scale but in which like numerals represent like parts:

Figures 1, 2, and 3 are sketches generally diagrammatically showing, in single line form, several systems embodying our invention, Fig. 1 having a potential charge-detector suspended in an enclosure, Fig. 2 having a field-gradient charge-detector near the floor of an enclosure, and Fig. 3 having a current-collection charge-detector in the cleaned air feed-duct for an enclosure;

Fig. 9 is a sketch of electrical connections and of some parts, in section, of a modified system in accordance with our invention in which an alternating-current is derived from a charge-detector;

Figs. 10 and 11 are sectional views substantially along the lines X—X and XI—XI, respectively, of Fig. 9;

Fig. 12 is an elevational view of a voltage- or field-gradient charge-detector for use in a system embodying our invention such as that shown in Fig. 2;

Fig. 13 is a sectional view on the line XIII—XIII of Fig. 12;

Fig. 14 is a longitudinal sectional view of a charge-detector for use in an embodiment of our invention such as that shown in Fig. 3;

Fig. 15 is a diagram of an electrical system under control of the charge-detector of Fig. 14;

Fig. 16 is a diagram of another system for providing a collecting voltage on the charge-detector of Fig. 14.

Figure 5:
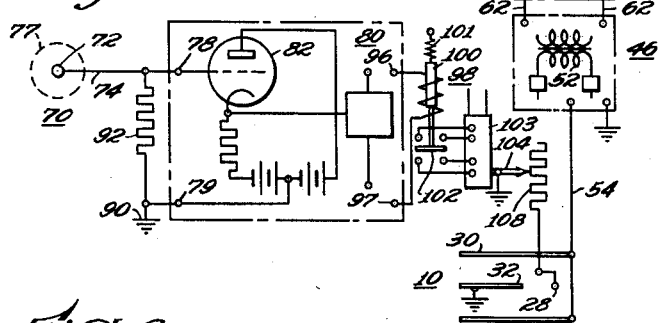
Fig. 5 is a circuit diagram similar to Fig. 4, but showing a different modification.

We have chosen to describe and illustrate our invention mostly in connection with the form and arrangement of electrostatic air-cleaning means shown in Fig. 5 of the aforesaid Penney Patent 2,318,093, but we wish it to be clearly understood that our invention can be used in any suitable environment and with other electrostatic air-cleaning means or dust-precipitators of considerably different forms and arrangements.

Figure 1:
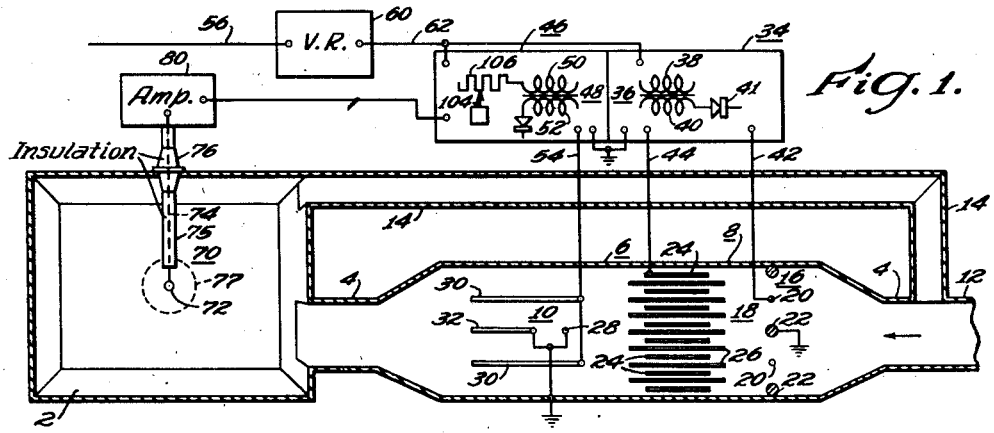
Figure 2:
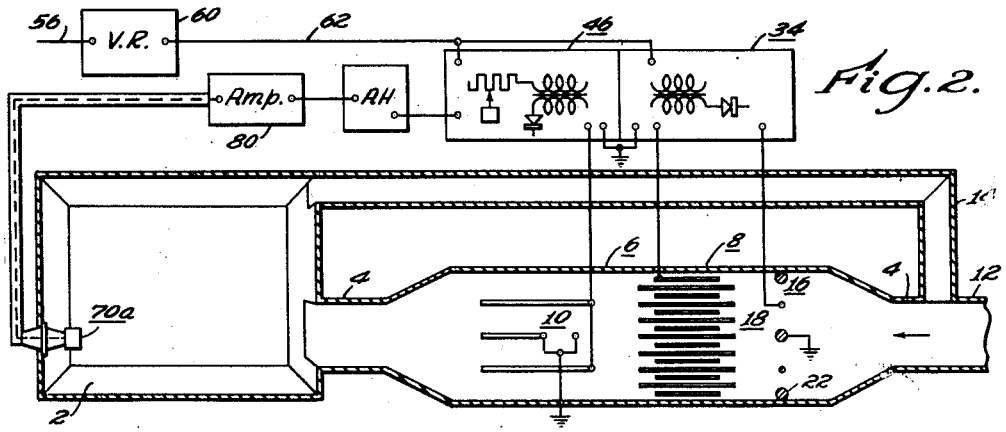
Figure 3:
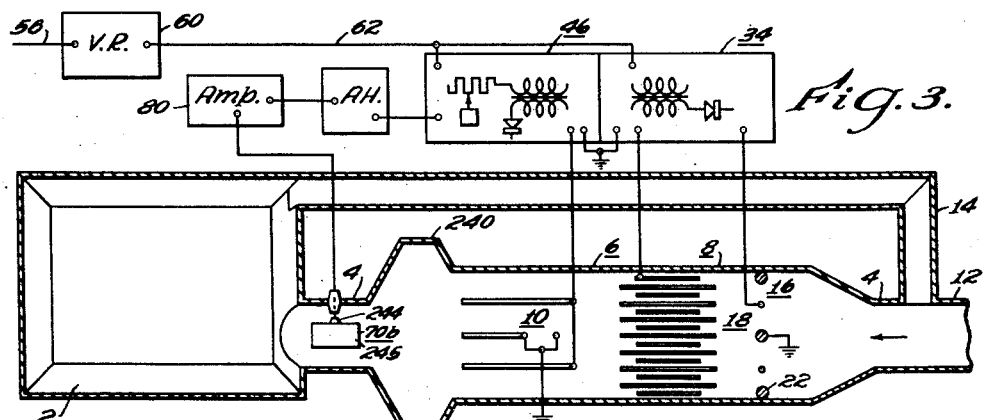

In the embodiments shown in Figs. 1, 2 and 3, an enclosure 2 is supplied with electrostatically cleaned air through a feed-duct 4 which receives the air from an electrostatic air-cleaning means indicated in its entirety by the reference numeral 6. The air-cleaning means comprises a main electrostatic dust-precipitator unit 8 and an ion-source or charge-neutralizer 10 arranged successively in the direction in which the air flows. Fresh air is fed to the air-cleaning means through an outside supply duct 12, and recirculating air through a branch duct 14. The proportions of fresh and recirculating air can be controlled in any suitable manner.

As more fully disclosed in the aforesaid Penney Patent No. 2,318,093, the electrostatic dust-precipitator 8 may comprise an ionizing zone or ionizer 16 and a dust-precipitating means 18. The ionizer 16 comprises relatively fine ionizing wires 20 spaced between and relatively insulated from relatively large cylindrical electrodes 22. The wires and electrodes are parallel and extend transversely across the direction for gas flow, in a manner known to the art. The dust-precipitating means 18 comprises a pair of relatively insulated series of electrodes comprising alternating plates 24 and 26 paralleling the gas flow. The ion-source or neutralizer 10 comprises a relatively fine ionizing wire 28 which is transverse to the gas flow and is centrally in discharging relation to two spaced plates 30 paralleling the gas flow. The neutralizer 10 further comprises an intermediate plate 32 spaced downstream from the ionizing wire 28. In the embodiment shown the ionizing wire 28 and the intermediate plate 32 are electrically grounded, and the plates 30 are insulated.

In a preferred construction a unidirectional voltage in the order of 12,000 volts is applied between the ionizing wires 20 and cylindrical electrodes 22, with the wires 20 positively charged. The cylindrical electrodes 22 may be electrically grounded, but other electrical connections can be used. A voltage about one-half of the aforesaid magnitude is applied across the relatively insulated plate-electrodes 24 and 26, the plates 26 being grounded and plates 24 insulated from ground. For the neutralizer, a unidirectional voltage is connected between the ionizing wire 28 and the intermediate plate 32, on the one hand, and the insulated plates 30 on the other. Since the ionizing wires 20 of the electrostatic dust-precipitator 8 create positive ions in the gas-stream, the ionizing wire 28 of the neutralizer 10 should be capable of creating negative ions in the gas-stream passing through it.

Voltages of the order required are usually obtained from one or more suitable voltage-conversion means or power-packs which usually include a transformer and rectifier means. A typical power-pack is illustrated in the Penney Patent No. 2,129,783 of September 13, 1938, but our invention is not limited to the circuits therein disclosed. In the interests of brevity in describing our present invention, only the step-up transformer, the rectifier, and the incoming and outgoing conductors of any suitable power pack are referred to and shown in most of the figures.

In Figs. 1, 2, and 3, a power-pack 34 for the main dust-precipitator 8 includes a transformer 36 having a primary winding 38 and a secondary winding 40. With additional means comprising a rectifier means 41 and other means not shown, the power-pack 34 makes suitable high positive potentials available at insulated conductors 42 and 44 which are respectively connected to the ionizing wires 20 of the ionizer 16 and the insulated plates 24 of the dust-precipitating means 18. Accordingly, the ionizing wires 20 provide positive ions for electrifying, or charging, gas-borne dust-particles. Similarly, a power-pack 46 for the neutralizer 10 comprises a transformer 48 having a primary winding 50 and a secondary winding 52 which, with means not shown, provides a suitable high positive potential on an insulated conductor 54 that is connected to the insulated plates 30 of the neutralizer 10. Accordingly, the ionizing wire 28 is relatively negative with respect to the plates 30, and provides negative ions. In the particular embodiments described, the path for current flow is completed through ground connections; but as is known to the art, other arrangements can be used.

Electrical energy for energizing the equipment described is obtained from commercial power lines customarily commonly available at the premises for the gas-cleaning installation. Such energy is usually alternating current at about 110 volts. A power line is indicated at 56 for delivering such electrical energy to the equipment.

In operation, the dust-precipitator 8 of the air-cleaning means 6 electrostatically cleans the air passing through it, with its ionizing wires 20 positively charged. Only a part of this cleaned air passes through the neutralizer 10 of the air-cleaning means 6. Positively charged dust-particles in the air passing from the dust-precipitator without passing through the neutralizer tend to create a positive space charge in the enclosure 2. The positively charged dust-particles in the air entering the neutralizer 10 become negatively charged and carry negative electric charges into the enclosure 2, tending to create a negative space charge in the enclosure. With proper voltage adjustments, the electrostatically cleaned air which leaves the air-cleaning means 6 and flows into the enclosure 2 can be made electrically neutral for practical purposes, that is, the positive and negative electrical charges carried by the dust-particles in the cleaned air counter-balance each other to an extent sufficient to limit the net electric charge in the enclosure 2, and thus the dirtying effect due to such charge. However, changing conditions such as may occur in the factors described hereinbefore, alter the proportion of the positive and negative electric charges so that adjustments may be occasionally required in order to maintain proper space charge conditions inside the enclosure. In accordance with some aspects of our invention automatic apparatus is provided which automatically makes the necessary adjustments.

The apparatus we choose to add to the equipment described is based on our aforesaid segregation of the factors which we have found to affect the space charge or the charge leaving the air-cleaning means into two groups; the first group including those which can be readily self-regulated, and the second including those which require an offsetting operation by some other means.

As previously described, the line voltage on the power line 56 falls into the first group. Such power lines are usually part of distributing systems which may have serious voltage fluctuations because of large but variable demands for power that take place in residential and commercial areas which the line feeds. In any case, the voltage on power lines is generally not constant; and public utility commissions have seen fit to make regulations requiring that the voltage on such a power line be so supervised that it does not change beyond prescribed limits. Very common limits prescribed are plus and minus 5 per cent from the rated voltage. When magnified and rectified in the power-pack to voltages as high as about 12,000 to 14,000 volts which the positive ionizing wires of a dust-precipitator of the described type require, a 5% regulation on the power line 56 reflects itself as a total spread of about 1200 to 1400 volts variation on the ionizing wires. Such a voltage change in the operating voltage between an ionizing wire and its associated non-discharging electrode in equipment of the type described, may mean a difference in discharge current from the wire of as much as approximately 30%, depending on the size of the ionizing wire, the electrode spacing and other considerations known to the art. Moreover, the change usually does not affect the total discharge current from a positively charged wire, such as that in the dust-precipitator 8, in the same way as it affects the discharge current from a negatively charged wire, such as used in the neutralizer 10. Accordingly, it is evident that a change in the power line voltage can seriously affect the operation of an electrostatic air-cleaning means and can disturb the positive and negative charge-balance in the cleaned air.

In accordance with our invention, we minimize the disturbing influence on the charge-balance arising out of line voltage changes by providing a voltage regulator before the power-packs. The regulator maintains the supply voltage to the power-packs within limits far closer than the 10% spread generally allowed in power supply lines. Such a voltage regulator is indicated at 60. It receives low voltage electric energy from the power line 56 and delivers the energy, at a more constant voltage, to the power-packs 34 and 46, by way of a connecting line 62. Extremely rapid response voltage regulators suitable for such purposes are common and can keep the output voltage on the connecting line 62 to within ¼% or less of a predetermined value while that on the line 56 varies as much as 5%. Hence, the supply voltage to the power-packs 34 and 46 is substantially constant; and the voltages on the insulated conductors 42, 44 and 54 to the various electrodes remain substantially fixed at whatever values they are set. Accordingly, there is a high degree of assurance that any electrical adjustment at any point in the system beyond the voltage regulator 60 will have an even and consistent effect. In other words, in addition to buffering the power-packs from voltage fluctuations on the main supply line 56, the output of the voltage regulator 60 provides a set floor or level from which adjustments can be made. For example, if it be desired to alter the main precipitator 8 so that it operates with 13,000 volts across its electrodes 20 and 22 instead of 12,000 volts, the number of effective turns in the primary winding 38 can be altered with assurance that the alterations will produce an operating high voltage which will not vary because of changes in the supply voltage. Accordingly a voltage is obtained which can be otherwise controllably adjusted for control purposes. It thus becomes possible to use, for example, the voltage on the neutralizer 10 for offsetting the disturbances in charge-balance which arise out of the aforesaid second group of factors, namely, dirt deposition on the electrodes, back-ionization, etc.

In accordance with this aspect of our invention, the voltage regulator 60 is adjusted to provide a predetermined constant voltage on the connecting line 62. An adjustable means in the neutralizer power-pack 46, or elsewhere, cuts down this voltage to a normal mean or average operating voltage or setting. By normal operating voltage, we mean the voltage value which results in a satisfactory charge-balance in the enclosure 2 or in the electrostatically cleaned air in the feed-duct 4. The adjusting means can be used to raise or lower the voltage from the normal voltage-value so as to adjust the ionization of an ionizing wire in a direction to offset or compensate for any alteration in the operating condition of the air-cleaning means, which takes place when any factor of the second group changes, as for example, back-ionization. Thus, if more positive charges are required in order to obtain a charge-balance in the air-stream, the actual voltage on the neutralizer wire 28 can be lowered from the normal operating voltage; and if less positive charges are required, the actual voltage can be raised. In accordance with our invention, the voltage-adjustments are automatically carried out with apparatus under control of a charge-detector.

In Fig. 1 a charge-detector 70 measurably responds to the space-charge potential in the enclosure 2 where it is suspended. In Fig. 2, a charge-detector 70a responds to the field-gradient at a point in the enclosure 2 where it is located. In Fig. 3 a charge-detector 70b responds to the charge carried by the cleaned air leaving the air-cleaning means 6.

The potential charge-detector 70 may be simply a metal probe suspended from the ceiling of the enclosure 2 preferably, but not necessarily, so as to be about at the center of the enclosure. It comprises a well-insulated, small metal mass or probe 72 shaped as a sphere and placed in a position where the potential of the space in the enclosure is sufficiently high to give a potential-voltage of satisfactory sensitivity. The exposed surface of the probe 72 has a lead-in wire 74 connected thereto which is inside an insulating sheath 75 of high grade insulating material. The sheath protects the lead-in wire 74 from electric field lines which permeate the space in the enclosure so that the potential at the probe 72 will more accurately reflect the potential at the particular point in space where it is located.

The probe 72 collects charges which charge up the electrostatic capacity of the probe system with respect to ground and necessarily must supply any leakage current to ground. Without leakage, the potential of the probe approaches the value actually existing in the space with the probe removed. Consequently, the probe system preferably should be very well insulated from ground. To this end, the lead-in wire passes through a bushing 76 in a wall of the enclosure. The bushing is also of very high grade insulating material. A polyethylene, a polytetrafluoroethylene or ceresin wax is a satisfactory material for the bushing as well as for the sheath 75.

When the space-charge potential in the enclosure increases, the probe can follow it by absorbing charges; but should the space-charge potential decrease, the probe should be able to lose charges to the necessary extent. Hence, a small leakage should be present. But as already noted, it is desirable to have this leakage as small as practical so that means is provided in the preferred form of our invention which is not dependent on leakage for speeding up the ability of the probe 72 to follow whatever change occurs in the space-charge thereabouts. This means ionizes a small region immediately surrounding the probe 72 with gaseous ions having equal positive and negative total charges, that is, with ion-pairs.

In accordance with a preferred embodiment of our invention, gaseous ion-pairs are produced in this region by a radio-active material, such as polonium or some suitable alloy capable of emitting alpha particles. Only a minute amount of the radio-active material is needed and can be placed on the outer surface of the probe 72. This radio-active coating on the probe 72 emits alpha particles which ionize the surrounding air and produce a great many gaseous ion-pairs per second. Any other charges produced by the radio-active material are negligible in comparison and can be ignored. In order to protect the radio-active surface of the probe 72 against dust-precipitation thereon, it is surrounded by a small spherical metallic screen 77 to which it is directly electrically connected. The spacing between the screen 77 and the radio-active surface of the probe 72 should be small as compared to the range of the alpha particles, which in air is about four centimeters for polonium. The screen is perforated in order to permit the alpha particles to reach outwardly in space to provide a satisfactory ionized region about the probe; but the holes in the screen should be smaller than the distance between the screen and probe in order to prevent any appreciable electrostatic field in the space between the screen and probe; and the wires of the screen still smaller in order not to obstruct too large a fraction of the ionizing-radiation.

The ionization of the air in the region around the probe 72 enables the probe rapidly to follow both increases and decreases in space charge, because gaseous ions have a much greater mobility than charged dust-particles. The oppositely charged ions of the ion-pairs do not disturb the potential of the probe so long as it is at the space-potential; but when the probe-potential is not at the space-potential the gaseous ion-pairs bring the probe-potential quickly to the space-potential. The ion-pair ions of one polarity combine with the electrified dust-particles making up the space charge and the remaining ions of the ion-pairs move to the probe. This action continues until the probe is again substantially at the potential of the space it occupies.

Should the space-potential, as reflected on the probe, be at a value beyond the limits prescribed, a corrective adjustment is initiated by the probe for adjusting the air-cleaning means. However, the energy of the electrical quantity available at the probe is so small that amplification is desirable. Hence, referring also to Fig. 4, the lead-in wire 74 applies the voltage between the probe 72 and ground, represented at 90, to the input points 78—79 of an amplifier 80. The amplifier may be any high sensitivity electronic amplifier having a plurality of amplification stages. It is shown in a simplified form in Fig. 4 as including an initial vacuum tube 82 having a control electrode 84, a cathode 86 and an anode 88. The lead-in wire 74 is connected to the control electrode 84 so that the potential of a probe with respect to ground is transmitted to the control electrode 84.

In order to substantially eliminate the effect of changes in the resistance of the insulation material, such as the bushing 76, which is sensitive to humidity, dust fumes, etc., it is desirable to add a well-protected resistor 92 of considerably lower and more constant resistance between the control electrode 84 and ground 90. For example, if the leakage resistance of the insulation varies from $10^{15}$ to $10^{13}$ ohms, dependent on humidity, then by adding a parallel constant resistance of about $10^{12}$ ohms, the fluctuations in resistance across the input points 78—79 arising from humidity variations are reduced in the order of about 100 to 1. Moreover, the added resistor 92 lowers the input impedance to the amplifier 80. Even so, the input impedance is so high that the use of a cathode follower type of circuit is recommended, in order to obtain a correspondingly high internal impedance in the first tube. Such an amplifier is indicated symbolically in the drawing by the tube 82 having a biasing circuit 94 and feeding into a further amplifying circuit 95. The output of the amplifier 80 is available at output points 96—97, and its magnitude is an amplified measure of the potential of, or the electric quantity measured by, the charge-detector 70.

Figure 4:
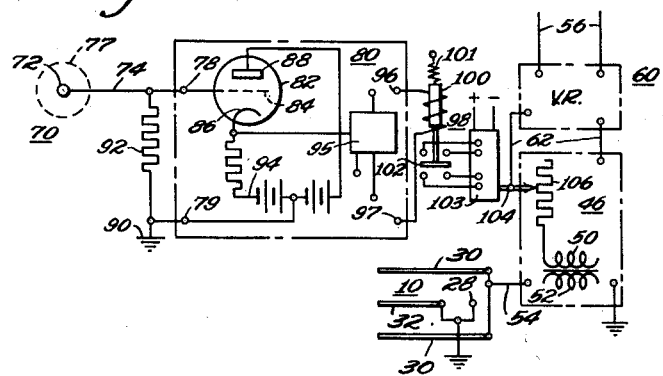
Fig. 4 is a somewhat more detailed diagram of electrical connections for a system such as shown in Fig. 1.

The electrical quantity at the output points 96—97, representative of the space-potential, is used to operate an adjusting or setting means for controlling the neutralizer 10. A simplified arrangement of such an adjusting or setting device is represented in Fig. 4 by a reversible, electric motor device in the form of a solenoid 98 operating on a core 100 against a tension spring 101. The position of the core is dependent on the current in the output circuit including points 96—97, in turn dependent on the potential of the control electrode 84 which in turn is dependent on the potential of the probe 72 of the charge-detector 70.

The operation of the apparatus can be understood by assuming that the space charge in the enclosure 2 is tolerable at a satisfactory positive value under which the potential placed on the control electrode 84 by the probe 72 is at some suitable mean or average value at which the core 100 is in a neutral position intermediate its stationary contacts. The core 100 has a movable contact 102 which controls the energization of a reversible motor 103 that controls the position of an arm 104 which is part of a variable resistor 106 in series with the primary winding 50 of the power-pack 46. Should the space charge in the enclosure 2 increase positively beyond a desired range, the probe potential rises and the current through the solenoid will be increased, thereby forcing the core 100 downwardly therein, and at the same time moving the contact 102 on the core downwardly into engagement with the lower stationary contacts. The motor 103 is thereby energized, and slowly moves the arm 104 downwardly, decreasing the resistance of the resistor 106 so that the voltage across the primary winding 50 is increased, resulting in a higher voltage on the insulated conductor 54 to the insulated plates 30 of the neutralizer 10. The voltage between the ionizing wire 28 of the neutralizer 10 and the insulated plates 30 being increased, the negative ionization from the wire also is increased. This means that the neutralizer will increase the negative charges delivered to the air for counterbalancing the excessive positive increment of the space charge detected by the probe 72.

Should the space charge become more negative with respect to the established tolerable value, the means current in the solenoid 98 will decrease. The spring 101 will then cause the contact 102 to move upwardly in accordance with the lesser current, so that the motor 103 will be energized but in a manner to move the arm 104 upwardly, thereby increasing the resistance of the resistor 106. The result is that a lower voltage is placed across the oppositely charged electrodes 28 and 30 of the neutralizer 10, so that the number of negatively charged particles introduced in the cleaned air stream is decreased. Hence a system combining the features of Figs. 1 and 4 automatically tends to preserve a space charge in the enclosure at some mean or average value determined by the amplified output current of the amplifier 80, the position of the arm 104 and the design of the resistor 106, any of which can be designed, as is known to the art, for a considerable range of flexibility. In a sense, the neutralizer 10 and gas-cleaning means 6 provide charged matter to the enclosure 2 in amounts determined by a measure of the space charge in the enclosure.

The circuit means which supplies a high voltage across the neutralizer ionizing-electrodes comprises the voltage regulator 60, the line 62, the voltage-converting means 46, the conductor 54 and the grounded return circuit. The resistor 106 is in the low voltage side of this circuit means. However, instead of operating on the low voltage side of the transformer 48 for the neutralizer 10, the charge-detector 70 can cause a variation in a variable voltage-consuming resistor in the high voltage circuit so that it will directly vary the potential on the ionizing wire 28 of the neutralizer 10. In such case it is desirable to insulate the ionizing wire 28 from ground, and to connect it to ground through a circuit-branch which includes the voltage-consuming resistor. This embodiment is shown in Fig. 5 and is of particular advantage in arrangements in which the neutralizer 10 and the main dust-precipitator 8 obtain their high voltage electrical power from the same power-pack. In Fig. 5, the ionizing wire 28 is grounded through a variable high-resistance resistor 108 which the arm 104 engages, while the intermediate plate 32 is separately grounded.

In Fig. 5 downward movement of the core 100, arising out of an increase in positive space charge in the enclosure 2, results in the arm 104 being moved in a direction for decreasing the resistance of the high-resistance resistor 108. The lowered resistance of the resistor 108 causes it to consume less voltage, and the ionizing wire 28 is brought closer to ground potential. Accordingly, as the space charge tends to become more positive, the voltage between the wire 28 and the insulated plates 30 is increased. An increasing negative space charge causes a reverse adjustment which lowers the negative ionization of the wire 28.

Figure 6:
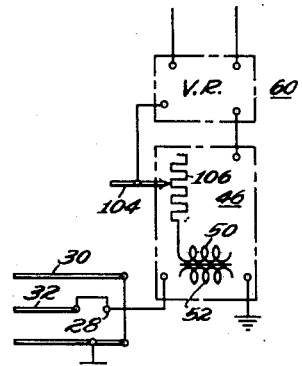
Figs. 6 and 7 are diagrams generally corresponding to Figs. 4 and 5, respectively, but having modified connections in the neutralizer.
Figure 7:
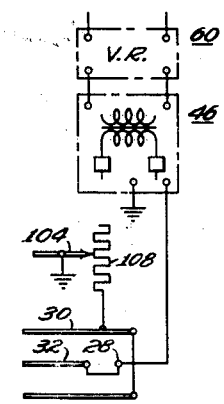

Since negative ionization is obtained in the neutralizer 10 by having the insulated plates 30 positive with respect to the wire 28, it is obvious that a similar electrical ionizing arrangement is obtained by grounding the plates 30 and fully insulating the wire 28 for the full negative potential. Such embodiments are shown in Figs. 6 and 7 which otherwise substantially correspond to Figs. 4 and 5.

For satisfactory operation of the air-cleaning means 6, the space charge in the enclosure 2 can be permitted to vary between acceptable limits. An exactly neutral or zero space charge is not necessary. For an average room 20 x 20 x 10 feet, a space charge of between plus and minus 75 volts will not have an excessive dirtying effect under many circumstances. Hence, a suitable anti-hunting device can be added which delays corrective action on a neutralizer 10 until the space charge gets beyond a preset range. Such an anti-hunting device can be incorporated in Figs. 4 and 5 by having the motor operate the arm 104 very slowly through a speed-reducing gearing of large reduction ratio.

Figure 8:
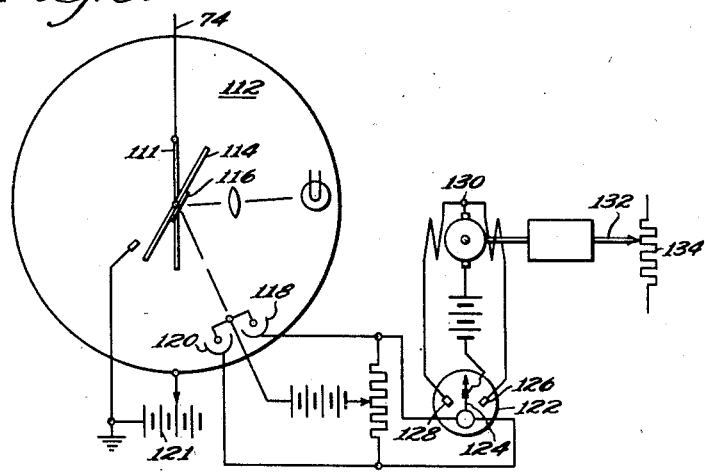
Fig. 8 is a circuit diagram of a modified arrangement in accordance with our invention, in which an anti-hunting device is incorporated.

Another embodiment having anti-hunting means is illustrated in Fig. 8. Referring to Fig. 8, the charge-detector lead-in wire 74 is connected to a stationary vane 111 of quadrant electrometer instrument 112 having a movable vane 114. A change of space-charge potential in the enclosure 2 will cause the vane 114 to turn. A mirror 116 is attached to the vane 114 for reflecting a light beam which, when the space charge is within the acceptable range, lies midway between a pair of photo-sensitive devices 118 and 120. The photo-sensitive devices 118 and 120 are opposite arms of a Wheatstone bridge arrangement having a center-zero galvanometer 122 for indicating when the bridge is balanced. The bridge is balanced when the center of the light beam is centrally of the space between the photo-sensitive devices 118 and 120. In the particular embodiment shown, to which we are not limited, separate spaced photo-sensitive devices 118 and 120 are provided; and light beam can move a predetermined distance from its central position, representative of one-half the insensitive range for the space charge, without striking a photo-sensitive device 118 or 120. By the addition of a biasing voltage 121, the direction in which the vane 114 will turn can be made to depend on whether the space charge is excessively negative or excessively positive.

If the change in space charge as detected by the charge-detector 70 is large enough, the mirror 116 will be turned enough to cause the light beam reflected by it to shine on one or the other of the devices 118 and 120. The bridge-balance is upset and the galvanometer 122 moves one way or the other, depending on the polarity of the space charge which causes the deflection of the mirror-carrying vane 114. The galvanometer 122 has a moving contact arm 124 adapted to engage either a contact 126 or a contact 128. Assuming that an excessive space charge in the positive direction causes the arm 124 to engage the contact 126, a circuit is completed to a reversible motor 130 which, through gearing, moves an arm 132 of a variable resistor 134 in one direction. Should the space charge become excessively more negative, the galvanometer 122 would engage the contact 128 and complete a reversing circuit for the motor 130 for moving the arm 132 in the opposite direction. The arm 132 and the resistor 134 correspond to the arm 104 and the resistor 106 or resistor 108 of Figs. 4 and 5. Hence, movement of the arm 132 controls the discharge current from the ionizing wire 28 of the neutralizer 10 in the manner discussed in connection with said Figures 4–7. When the contact 126 is engaged, the negative charges from the neutralizer 10 increase; and when the contact 128 is engaged, the negative charges from the neutralizer 10 decrease.

The range in which the space-charge potential can vary without initiating a change in the discharge current from the ionizing wire 28 is controlled by the spacing between the light-sensitive devices 118 and 120, but can also be controlled by the spacing between the galvanometer contacts 126 and 128 with respect to the mid-position of the galvanometer arm 124. Positioning a contact 126 or 128 farther from the arm 124 will make it necessary to have a greater variation in space charge before the arm 124 will engage such contact 126 or 128. Decreasing the spacing between the arm and its contacts has a reverse effect.

Accordingly, the embodiment of Fig. 8 introduces a desensitizing means which allows the space charge to migrate within a selected range without adjustments on the neutralizer 10. It is only when the space charge varies relatively considerably from the middle point of this range that a corrective adjustment takes place, the extent of which depends on the controlled speed of movement of the arm 104 or 132. By having the arm move very slowly, the corrective action can be made sufficiently slow to permit the space charge to be brought back to the closest limit of its operating range with little tendency to overshoot in the other polarity-direction.

The anti-hunting means has special advantage in connection with large enclosures. In large enclosures some time is required for the enclosure to become completely permeated with air that has passed through the air-cleaning means after a given instant. Anti-hunting or time-delay means allows the space charge to become considerably more uniform throughout the enclosure before an operation is initiated for adjusting the voltage across the relatively insulated electrodes of the neutralizer. Accordingly, the addition of anti-hunting features for controlling either the point at which a corrective action begins or the rate at which it takes place, or both, is a material improvement in the air-cleaning system. The space charge in an enclosure can become more stabilized, and the frequency of the adjusting operations on the air-cleaning means is decreased.

Instead of utilizing a potential charge-detector, such as the charge-detector 70, to provide a unidirectional electrical quantity on the amplifier 80, the charge-detector can be connected to equipment which converts the D. C. potential on the probe to an alternating-current electrical quantity which is also measurably representative of the probe-potential. An embodiment of this kind is shown in Figs. 9–11.

To this end, the lead-in wire 74 is connected to an induction generator which is represented in its entirety in Fig. 9 by the reference numeral 139. It comprises an insulated circular metallic disc 140 and several associated metallic sectors with which it can form an electric field; the disc and sectors all being within a metallic shielding box 142 that is electrically grounded. The sectors comprise a plurality of equal co-planar stationary alternating insulated metallic sectors 144 and 146 which are also relatively insulated. The group of sectors 144 are electrically directly interconnected; and the group of sectors 146 are also electrically directly interconnected. Centrally, the sectors 144 and 146 are cut away so as to permit a rotary grounded shaft 148 driven by a motor 149, to insulatedly pass therethrough. The shaft 148 carries a plurality of equally spaced grounded sectors 150, each of which is of slightly less than double the angular spread of a sector 144 or 146. There are one-half as many sectors 150 as there are sectors 144 and 146. Conductors 151 and 152 connect the sectors 144 and 146 respectively, to input points 153 and 154, respectively, of an amplifier 156. A resistor 157 is connected across the input points 153 and 154 and may have its mid-point grounded.

In operation, the disc 140 assumes the potential of the probe 72, and establishes an electrostatic field which extends to the alternating sectors 144 and 146. Rotation of the sectors 150 causes an alternating-current voltage, or periodic voltage, to be generated across the conductors 151 and 152.

In order to increase the magnitude of the electrical quantity produced by the induction-generator, the different sectors should be so arranged that the mechanical movement of the rotary shaft 148 with the sectors 150 causes a large variation in the electrostatic capacity between the stationary induction disc 140 and the sectors 144 and 146. It is also desirable that the capacity between ground and the insulated sectors 144 and 146 be small at all times.

The alternating electric quantity delivered to the input points 153 and 154 of the amplifier 156 appears in much amplified magnitude across the output points 158 and 160 of the amplifier, from where it is delivered to conductors 162 and 164. The electrical quantity on the conductors 162 and 164 will have a phase displacement with respect to the rotating sectors 150, which depends on the potential-polarity of the disc 140. The quantity resulting from a positive polarity would be displaced 180° from a quantity resulting from a negative polarity. Hence it is necessary to provide a polarity selecting means so that any subsequent adjustment of the ionization of the neutralizer 10 by the electric quantity on the conductors 162 and 164 will be in the proper sense, i. e., to provide more negative charges if the polarity selecting means indicates that the probe potential is excessively positive, and vice versa. Any suitable polarity selecting means can be used, the one shown comprising a pair of rectifier tubes 166 and 168; the former comprising a cathode 170, an anode 172 and a grid or control electrode 174, and the latter comprising a cathode 176, an anode 178 and a grid or control electrode 180. A synchronizing device 182 places biases on the control electrodes 174 and 180, the biases being in synchronism with the half-waves of the alternating current voltages across the cathode-anode circuits of the tubes 166 and 168.

The synchronizing device 182 comprises a rotor 184 and stator coils 186 and 188. For obtaining synchronism, the rotor 184 is driven through gearing 190 by the motor 149 so that its speed is always in direct proportion to and synchronized to the rotation of the shaft 148.

The tubes 166 and 168 are connected reversely in parallel. The coils 186 and 188 are respectively connected across the cathode and grid circuits of the tubes 166 and 168. The arrangement feeds into an anti-hunting means comprising a capacitor timing circuit which includes a resistor 192, a capacitor 194, a gaseous glow tube 196 and the operating means of a polarized stepping relay 198. The capacitor 194 comprises a plurality of relatively insulated capacitor-plates 200 and 202.

Upon actuation, the relay 198 moves an arm 204 one way or another in steps along a variable voltage-consuming tapped resistor 206 so that the resistor can be adjusted in increments in either direction. The resistor 206 may be of low resistance and in series with the primary 50 of the transformer 48 in the neutralizer power-pack 46 so that the resistor corresponds to the resistor 106 of Fig. 4; or it may have a high resistance and be inserted in the grounding circuit of the neutralizer ionizing wire, as shown in Fig. 5, in which case the resistor 206 would correspond to the resistor 108 of Fig. 5.

The polarity selecting means causes the capacitor 194 to be charged in one direction or another, depending on the polarity of the disc 140.

The operation is as follows: The rotor 184 provides opposite magnetic poles which generate alternating current voltages in the coils 186 and 188. The voltages generated render the control grids of the tubes 166 and 168 positive for the same half-cycles. Assume that at some given instant the conductor 162 is positive and the conductor 164 negative with respect to cathode 176 when the probe 12, and hence the disc 140, is excessively positive. If at the same instant the control grid 180 of the tube 168 is also positive, the tube 168 will provide a flow of electrons from its cathode 176 to its anode 178 in the direction indicated by the arrow 208. Hence, the capacitor 194 will charge up with its plates 200 negative and its plates 202 positive. After a time determined by the resistor 192 and the magnitude of the voltage across the conductors 162 and 164, the capacitor 194 will be charged up to a voltage in excess of the break-down voltage of the glow tube 196 and a pulse of current will pass through the operating means of the polarized relay 198. The arrangement is such that this pulse moves the arm 204 in a direction for increasing the negative ionization provided by the ionizing wire 28 of the neutralizer 10.

If the potential on the disc 140 had been negative at the instant assumed, the conductor 162 would be negative and the conductor 164 would be positive at such instant, so that there would be no current flow through the tube 168, although the control grid 180 is positive during that half wave. However, current would flow through the other tube 166 which has its anode 172 connected to the conductor 164. Electrons would flow from the cathode 170 to the anode 172 and produce a negative current flow in the direction of the arrow 210, this direction being opposite to that which occurs when the current flows through the tube 168.

When the tube 166 is conductive, the capacitor 194 charges up with the polarity of its plates 202 negative and that on its plates 200 positive. Accordingly, under an excessive negative space charge in the enclosure 2 the capacitor is charged reversely to the manner in which it is charged when the space charge is excessively positive. When the glow tube 196 breaks down with negative space charge, the pulse of current through the polarized relay 198 will be in a direction opposite to that previously described for the positive space charge, and will cause the arm 204 to move a step in a direction reverse to that provided when the tube 168 conducted current. This means that the neutralizer 10 will now be adjusted a step in a direction for decreasing the voltage across its electrodes so that fewer negative charges will be introduced into the cleaned air.

Summarizing, the tube 168 is conductive and the capacitor 194 charged in one direction when the instantaneous value of the alternating current across the conductors 162 and 164 results from one potential-polarity on the disc 140, but the tube 166 is conductive and the capacitor 194 charged in an opposite direction of the disc has an opposite potential-polarity. The polarized relay 198 will be operated at a single step upon each break down of the glow tube 196, and in a direction depending on the polarities on the plates of the capacitor 194.

The operation of the system of Fig. 9 in connection with space charge can be illustrated by assuming that a space-charge potential of 75 volts is the maximum permissible at the probe 72 of the enclosure 2, and that it is immaterial whether this potential results from a positive or a negative space charge. Assume that the space charge potential is at some intermediate value but is building up positively. The disc 140 may be either positive or negative at a tolerable value, and a low alternating-current electrical quantity exists on the conductors 162 and 164 so that the capacitor 194 is intermittently charged. The charge on the capacitor builds up to a maximum magnitude which depends on the A. C. voltage across the conductors 162 and 164 (assuming no leakage in the capacitor 194). The A. C. voltage on the conductors depends, in turn, on the D. C. potential of the disc 140. However, should the potential on the disc build up to a magnitude above 75 volts positive (the assumed limit), the D. C. voltage on the capacitor can build up high enough to cause the flow tube 196 to break down so that the polarized relay 198 is operated to step the arm 204 in a proper direction for reducing the space-charge potential. If the space-charge potential continues to be excessive, the arm 204 will be intermittently stepped, and the degree of ionization by the neutralizer 10 will be continually adjusted until the space-charge potential is brought to within the tolerable or desired range.

There is a time interval between each stepping of the relay 198. This time delay is advantageous because the one-step adjustments of the neutralizer can not be detected in room 2 immediately; it requires some time for the charge to become equalized throughout the room. Therefore the response of the detector will lag (probably as much as several minutes in common installations) behind the neutralizer adjustment. For this reason a time delay such as that furnished by the time constant of the capacitor-resistor circuit, is desirable to reduce hunting.

In instances where a probe can not be conveniently suspended in an enclosure, or where it would be objectionable as unsatisfactory for other reasons, a field-gradient charge-detector, such as 70a in Fig. 2, can be used which also has some advantages of its own. Such a charge-detector detects the field-gradient which accompanies a space charge in the enclosure. It is similar in its operation to the induction generator of the embodiments shown in Figs. 9–11, in that a mechanical shutter cuts lines of force but differs in that it utilizes the lines of force of the space charge directly. A field gradient detector 70a is indicated in Figs. 12 and 13.

The field gradient charge-detector 70a comprises a grounded pair of rotary arcuate members 220 and 222 which are opposite each other, and each of which is about 90° in angular extent on the same circumference. A first pair of arcuate members 224 and a second pair of arcuate members 226 are disposed along a common circumference which is concentric to and smaller than that including the members 220 and 222. The pairs of parti-cylindrical members 224 and 226 are stationary and relatively insulated although the members of the pairs spacially alternate. Each pair has its members electrically connected together by a conductor 228 for the members 224 and a conductor 230 for the members 226. A motor 232 rotates the members 220 and 222 so as to periodically vary the electric field which the space charge establishes to the members 224 and 226. A periodic electrical quantity is thus produced on the conductors 228 and 230. By connecting these conductors to input points such as 153 and 154 of Fig. 9, in place of the conductors 151 and 152 shown thereon, an electrical quantity will be placed by the conductors 228 and 230 on the input points 153 and 154. This electric quantity will be a measure of the field-gradient at the point in the enclosure 2 where the charge-detector 70a is located. Accordingly, by using the apparatus of Fig. 9 which is to the right of the input points 153 and 154, and by having the motor 232 properly drive a synchronizing device similar to 182, the electrical quantity produced by the charge-detector 70a can be made effective for controlling the ionization provided by the neutralizer 10, in a manner similar to that described in connection with Fig. 9.

As a general rule, the space charge in large enclosures changes slowly, as previously mentioned, because ventilating systems usually are arranged to change the air in an enclosure at a rate of about 10 times per hour and frequently less. This means that the response of a probe, such as 72 in Fig. 1, has a time lag as compared to the actual electric charge in the air being introduced into the enclosure. For a much more rapid response to the charge concentration in the air leaving the air-cleaning means a charge-detector can be placed in a feed-duct at the outlet of the air-cleaning means. However, a potential or field gradient detector such as that of the prior embodiments, would have its sensitivity decreased in a small duct. In order to obtain a highly sensitive indicator which can be used in the duct, we utilize a detector which collects the charges in the air flowing through it. For this purpose, in accordance with our invention, we provide a current-collecting charge-detector the principles of which are described in connection with the embodiment of Fig. 3, and Figs. 14–16.

With reference to Fig. 3, such a charge-detector 70b is intended to measurably respond to the concentration of charges in the cleaned air flowing in the feed-duct 4. Accordingly, in Fig. 3, the arrangement is such that the air-cleaning means 6 feeds into a mixing chamber 240 in which the charged or electrified matter in the air from the main dust-precipitator 8 and neutralizer 10 become thoroughly mixed. Hence, whatever charges are in the air leaving the mixing chamber 240 are uniformly distributed therethrough. A sample of this uniformly charged air passes into the charge- or current-collecting charge-detector 70b which is constructed in such a way as to collect practically all of the electric charge which is carried into it by the flowing air, but only a small percentage of the actual air-borne dust-particles which carry such charge.

Referring more particularly to Figs. 14 and 15, the charge-detector 70b comprises a cylindrical metallic unit-assembly 242 which is insulatedly supported by a bushing 244 in a housing 245 carried in any suitable manner in the feed-duct 4, the feed-duct 4 being cylindrical in this case to correspond to the shape of the housing and the unit-assembly. The unit-assembly 242 comprises an outer tubular section comprising a metal cylindrical tube 246. A small inner metal rod 248 is insulatedly supported from the tube 246 by an insulator 249. The rod lies along the axis of the tube 246 and is coated with a radio-active material. A screen 250, similar to the screen 77 of Fig. 1, surrounds the rod 248 and is directly electrically connected thereto.

On the downstream side of the rod 248, the tube 246 contains a plurality of alternately relatively insulated, closely spaced tubes 252 and 254 located concentrically about a coaxial central rod 256. The tubes 252 are electrically connected together and to the rod 248. The tubes 254, the rod 256, and the outer tube 246 are electrically connected together. A D. C. voltage is applied across the group of parts consisting of the rod 248 and the tubes 252, on the one hand, and the group of parts consisting of the tubes 254, the outer tube 246 and the rod 256, on the other hand. To convey the necessary voltage, conductors 74' and 74" are respectively, connected to the group of parts. These conductors 74' and 74" are relatively insulated from each other and from ground; and any suitable means may be used to apply a voltage across them, such as, for example, an insulated battery.

In Fig. 15, an arrangement is shown for applying voltage to the conductors 74' and 74". It comprises a contact-type rectifier 262, such as a small stack of selenium or copper oxide coated discs, and a capacitor 264 connected in series across a secondary winding 266 of a transformer 268. The transformer also has a primary winding 270 and a core of two separate parts 272 and 274. The secondary winding 266 is on the core-part 272 which is insulated from ground, and the primary winding is on the core-part 274. The two core-parts with their windings are relatively insulated against conduction of current therebetween by means including an air gap or non-magnetic insulating material, but magnetic flux can cross the gap for inducing a voltage in the secondary winding 266. Because of the rectifier 262, the induced voltage builds up a unidirectional voltage on the capacitor 264, across which the conductors 74' and 74" are connected. Conductively connected to the conductor 74' is an induction disc 278 which corresponds to the disc 140 of Fig. 9.

The radio-active material on the rod 248 introduces a multitude of gaseous ion-pairs into the space between the rod 248 and the tube 246, which can electrically neutralize the dust-particles in the air stream flowing inside the tube 246. The electric charges carried by the dust-particles are, in effect, transferred to ions of the ion-pairs. The charge in the dust-particles is thereby removed and the charge-balance of the ion-pairs is correspondingly unbalanced. Because of their high mobility the charged gaseous ions are very easily collected through the action of an electrostatic field. In the specific embodiment being described, the charges on the gaseous ions are collected by the oppositely charged groups of the unit-assembly 242. The so-collected charges provide a voltage between the unit-assembly 242 and ground represented by the grounded housing 245. This voltage is a measure of the charge concentration in the air entering the unit-assembly 242, that is, an average number of charges on the air-borne dust-particles per unit volume of air. The magnitudes which this voltage approaches is not limited by a space potential built up by space charge as is the case with space-charge potential of the prior embodiments, but by the repulsion, in an upstream direction, of approaching charged particles in the air about to enter the unit 242, and by current leakage from the tube 246 to ground. Increased sensitivity can be obtained by the addition of a small fan 275 which increases the power of the air to carry charged particles into the unit against such repulsion.

The fast gaseous ion-pairs produced in the insulated unit-assembly 242 should be substantially entirely confined to the space within the unit-assembly. An appreciable number of such ions would tend to discharge the unit-assembly to ground if they were permitted to permeate the space between the unit-assembly and the grounded housing 245 or any other grounded members. Consequently, the oppositely charged tubes 252 and 254 are provided in the downstream part of the unit-assembly. Shielding screens 280 and 282 are also provided across the upstream and downstream ends of the unit-assembly 242. Each of these screens may consist of a plurality of staggered perforated plates having their openings out of line so that no radiation from the radio-active material on the rod 248 can pass through them.

In summary, the air-borne charged dust-particles lose their charges as they pass through the unit-assembly 242. The unit-assembly collects the charges as a measure of the residual charge in the gas leaving the mixing chamber 240. As charges are collected by the unit-assembly, it becomes negative or positive as a whole with respect to ground. It will be positive or negative in accordance with the polarity of the net charge on the dust-particles entering the unit-assembly. The magnitude of the potential on the unit-assembly will depend on the magnitude of the charge concentration carried by the dust-particles and the current-leakage of the unit-assembly to ground. Accordingly, a corresponding positive or negative potential will exist on the induction disc 278. This potential can be used to control the air-cleaning means 6 by utilizing suitable equipment of any of the suitable prior embodiments, or other arrangements. For example, the equipment, which is to the right of the induction disc 140 of Fig. 9, can be used. In such embodiment the disc 278 of Fig. 15 replaces the disc 140 of Fig. 9. The potential to which the unit-assembly 242 builds up is transferred to the disc 278, and a shielding box 284 prevents stray fieldlines from modifying the action of the induction disc 278 with respect to its co-operating sectors which provide the electrical measuring quantity for control purposes. The box 284 is grounded through a controllable resistor 286 of high resistance.

As an example of the principles underlying the charge-detector 70b, assume that air flows through it at approximately 91 meters per minute (300 feet per minute) and that the tube 246 has a diameter of 8 centimeters, and that the rod 248 has a length of 10 centimeters. The time required for air to flow past the rod 248 would be approximately $\frac{1}{15}$ of a second. This means that charged dust-particles flowing with the air have about $\frac{1}{15}$ of a second to become neutralized or to transfer their charges to gaseous matter. The charges on such gaseous matter will be collected in the detector. Such collection will depend on the usual principles underlying precipitation of charged matter. The physical arrangement and dimensions of the collectors are involved, as is known to the art. In a device having the dimension described, a gaseous ion can be moved from the screen 250 to the tube 246 in about $\frac{1}{15}$ of a second by a voltage of 240 volts across the insulated groups of the unit-assembly, assuming that the mobility of the gas ion is one centimeter per second per volt per centimeter. The oppositely charged tubes 252 and 254 provide added assurance for collecting the gaseous ion and can easily be the primary means for collecting the gas ions.

Should the air leaving the mixing chamber 240 and entering the aforesaid unit-assembly have a charge density of $10^{-6}$ statcoulombs per cubic centimeter, the current collection would be $2.5(10)^{-12}$ amperes. With a leakage resistance of $10^{13}$ ohms through which such current air flow, the current can establish a maximum voltage of 25 volts between the unit-assembly and ground. The rate at which this maximum voltage is approached will depend on the capacitance to ground of the tube 246 and parts connected thereto. For the condition assumed, and a capacitance equal to 25 micromicrofarads, the potential will initially rise about .1 volt per second, and less thereafter.

The collecting voltage across the two relatively insulated groups comprising the unit-assembly 242, can be supplied in many ways. Another arrangement is shown in Fig. 16. In this variation, a capacitor 290 is connected across the conductors 74' and 74''. The capacitor is periodically charged by intermittently connecting it to a battery 292, or other source of D. C. voltage, through intermittently operated pairs of contacts 294 and 296 which connect and disconnect the battery to the capacitor 290. The pairs of contacts 296 should be the first to close and the last to open in order to have the D. C. measuring voltage on the induction disc 278 undisturbed by the collecting voltage on the capacitor 290.

The apparatus of Figs. 3, 14, 15 and 16 will keep the space charge in the enclosure down by operating on the neutralizer 10, in accordance with the charge actually carried in the cleaned air being delivered to the enclosure. In this embodiment the detector 70b responds so quickly that more rapid control of the neutralizer is possible, and the air supplied to the enclosure is kept so free of electric charge that an objectionable space-charge does not be built up in the enclosure.

Equipment embodying the teachings and principles underlying the unit-assembly 242 can be used for removing the electric charge in the air leaving the air-cleaning means or supplied to an enclosure. For large volumes of flowing gas the equipment can be enlarged or multiplied. Such equipment, with or without charge collecting means, such as for example the oppositely charged tubes 252 and 254, could be used without control apparatus, such as the induction disc 278 and the parts to the right thereof in Fig. 15.

In general, equipment such as the current-collecting charge-detector 70b operates upon the principle of transferring any charges on the dust-particles entering it to highly mobile gaseous ions. Preferably these gaseous ions are then forced, through the action of an electric field, to give up their electric charges before they leave the equipment.

While the gas around the rod 248 is well ionized with ion-pairs, both the dust-particles and the gas leaving the equipment are substantially electrically neutral. Accordingly, a system for providing electrically-neutral cleaned air could consist solely of a main dust-precipitator, such as, for example, a precipitator 8, and a charge remover or collector, such as, for example, the rod 248 and the tube 246. Preferably such tube and rod (with its screening means) should be relatively insulated for a collecting voltage to be applied across them. By grounding the tube, it can be used as a duct through which the air passes. No neutralizer, such as 10, would be required in the air-cleaning means.

Figure 17:
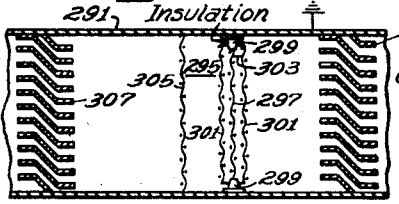
Fig. 17 is a sectional view of a modified means for removing electric charges from a stream of moving air.

A device for removing charges from dust-particles in a flowing gas is shown in Fig. 17. In this embodiment, electrostatically cleaned air enters a metallic feed duct 291 immediately after leaving an electrostatic air-cleaning means of any conventional design, with or without a charge-neutralizer such as the neutralizer 10 of the prior embodiments. A satisfactory form of electrostatic air-cleaning means is that shown and described in the aforesaid Penney Patent No. 2,129,783 of September 13, 1938, but our invention is not limited thereto.

The cleaned air moves in the direction of the arrows shown in Fig. 17, and first passes through an upstream air-pervious radiation shield 293. The cleaned air then passes through a region which is well supplied with gaseous ion-pairs by an ion-creating or ionizing means 295. The ionizing means 295 comprises a grid 297 insulatedly supported across the feed duct by a plurality of insulators 299 attached to sides of the feed duct 291. The grid 297 has a plurality of radiating points having minute quantities of a radio-active material. The ionizing means also comprises a perforated screening means 301, such as those described for the detector 70 of Fig. 1, and the rod 248 of Fig. 14, which is arranged on both sides of the grid 297 so as to substantially eliminate any dust-precipitating electric field therebetween without preventing ionization of the outside region by alpha particles. The grid 297 and the screening means 301 are electrically kept at the same potential by a conductor 303. An ion-collecting means 305 is spaced downstream of the ionizing means 295. The air leaves the feed duct 291 through a downstream radiation shield 307.

The radiation shields 293 and 307 can be metallic vanes extending across one dimension of a rectangular feed duct and spaced across the other dimension. Each vane is bent into a plurality of angles so that straight line radiation cannot pass through the spaces between the vanes, but will strike a vane.

The ion-collector 305 may be of any suitable form and a D. C. voltage can be connected between it and the ionizing means 295 if desired. In Fig. 17 the ion-collector 305 has been shown as comprising a metal screen completely across the cross-sectional area of the feed duct and electrically connected thereto. If desired spaced relatively insulated plates operating along the lines of the tubes 252 and 254 of Fig. 14, can be added to or substituted for the ion-collector 305.

Any suitable means, other than that specifically referred to can be used to remove the charges from the electrified dust-particles. We have found that X-rays also cause a transfer of charges from the electrified dust-particles to gaseous matter which quickly deflects to a member, such as the tube 246 or other electrodes, to which it gives up its charge.

We have described our invention in many different forms and with many different variations and modifications of the parts of the systems herein described, so that it should be obvious that our invention is subject to many modifications and embodiments.

We claim as our invention:

1. A system of a type described comprising, in combination: electrostatic air-cleaning means and a gas-duct connected to an outlet thereof for conveying electrostatically cleaned air therefrom; a low-voltage power supply line; said air-cleaning means comprising a pair of relatively insulated cooperating electrodes for providing an ionized electrostatic field, and voltage-conversion means having an input and having an output connected to supply an ionizing voltage across said electrodes; a connection line including a voltage-regulator between said power line and said input; adjustable means associated with said voltage conversion means and operable thereon for increasing and decreasing said ionizing voltage; a charge-detector constructed and arranged so as to be exposed to said cleaned air, said charge-detector being characterized by developing an electric quantity thereon which is measurably representative of the charge in said air to which it is exposed, and an electrical means connected to said charge-detector and operable in accordance with the electric quantity in said charge-detector for operating said adjustable means.

2. An invention in accordance with claim 1, but characterized further by said electrical means comprising an anti-hunting mechanism.

3. A system of a type described comprising, in combination: a low voltage power line; electrostatic air-cleaning means comprising an electrostatic dust-precipitator having an ionizing electrode, a charge-neutralizer having an ionizing electrode, and voltage-conversion means having an input and output, said output providing a circuit connected to supply unidirectional ionizing potentials of opposite polarity to said ionizing electrodes; adjustable voltage changing means operable for changing the ionizing potential on the ionizing electrode of said charge-neutralizer; a connection line including a voltage regulator between said power line and the input of said voltage-conversion means; a charge-detector arranged to be exposed to electrostatically cleaned air; and an electrical device connected to said exposed charged-detector and to said adjustable voltage-changing means, said electrical device being characterized by including means operable by electrical quantities on said charge-detector for operating said adjustable voltage-changing means.

4. A system for supplying electrostatically cleaned air to an enclosure, comprising, in combination: electrostatic air-cleaning means and a gas-duct connected to an outlet thereof for conveying electrostatically cleaned air therefrom, said air-cleaning means comprising a pair of relatively insulated cooperating electrodes for providing an ionized electrostatic field, circuit means including voltage-conversion means having a transformer having a primary winding, and connections connected to supply an ionizing voltage across said electrodes, an adjustable voltage-consuming device in said circuit means for controlling the magnitude of said ionizing voltage, a charge-detector constructed and arranged so as to be exposed to said cleaned air, and an electrical means connected to said charge-detector and said adjustable device, said electrical means being characterized by including means responsive to electrical quantities detected by said charge-detector for automatically operating said adjustable device.

5. An invention including that of claim 4 but characterized further by said voltage-consuming device comprising a resistor connected in series with said primary winding.

6. An invention including that of claim 4 but characterized further by said voltage-consuming device comprising a resistor, said electrodes comprising an ionizing wire, and said circuit means comprising a grounding connection to said ionizing wire, said grounding connection including said resistor.

7. An invention in accordance with claim 4, but characterized further by said electrical means comprising an anti-hunting mechanism.

8. An invention comprising that of claim 7, but characterized further by said anti-hunting mechanism including a movable member which slowly adjusts said electrical means.

9. A system for supplying electrostatically cleaned air to an enclosure, comprising, in combination: electrostatic air-cleaning means comprising ionizing means including relatively insulated electrodes providing an ionized field for charging gas-borne dust-particles; voltage-conversion means having high voltage connections for supplying a unidirectional ionizing voltage across said relatively insulated electrodes; a variable voltage-consuming means for varying said voltage; a charge-detector constructed and arranged so as to be exposed to said cleaned air; an induction-generator comprising a plate connected to said charge-detector and associated with other plates for forming an electric field, and rotatory means providing a periodic electric quantity at the output of said induction-generator; amplifier means having an input connected to said output of said induction generator; a polarity-selecting means connected to the output of said amplifier means; and a setting means operated through said polarity-selecting means, for variably setting said voltage-consuming means.

10. A system for supplying electrostatically cleaned gas, comprising, in combination; electrostatic gas-cleaning means and a gas-duct connected to an outlet thereof for conveying electrostatically cleaned gas therefrom, said gas-cleaning means comprising ionizer means including relatively insulated electrodes providing an ionized field for charging gas-borne dust-particles, and voltage conversion means having high voltage connections for supplying a unidirectional ionizing voltage across said relatively insulated electrodes; a variable voltage-changing means for varying said voltage; a charge-collecting charge-detector insulatedly supported in said gas-duct, said charge-collecting charge-detector comprising a tubular section through which cleaned gas flows, a plurality of spaced relatively insulated electrodes, means providing a multitude of gaseous ion-pairs in the space between a pair of the last said electrodes, and insulated means for applying a voltage across the last said electrodes; amplifier means connected to said charge-detector; and an electric device connected to the output of said amplifier means and responsive to electric quantities on said charge-detector for operating said variable voltage-changing means.

11. An invention including that of claim 10, but characterized further by said amplifier means comprising an induction-generator connected to said charge-detector for providing an alternating-current quantity for amplification.

12. A system for supplying electrostatically cleaned air which is electrically substantially neutral, comprising the combination with electrostatic gas-cleaning means and a gas-duct connected to an outlet thereof for conveying electrostatically clean gas therefrom, said gas-cleaning means comprising ionizer means including relatively insulated electrodes providing an ionized field for charging gas-borne dust-particles, and means having high voltage connections for supplying a unidirectional ionizing voltage between said relatively insulated electrodes; of means for removing electric charges from dust-particles in an air-stream flowing in said gas-duct, comprising: an outer tubular section for an air-stream, ion-creating means operable and arranged to cause a space across the inside of said tubular section to be permeated with gaseous matter having gaseous ion-pairs, whereby electric charges on said dust-particles are transferred to the gaseous matter, and a collector for collecting the electrical charges on such gaseous matter.

13. An invention including that of claim 12, but characterized by said collector comprising a plurality of oppositely chargeable spaced members on the downstream side of said ion-creating means.

14. An invention including that of claim 12, but characterized in addition by having metallic screening means on the upstream and downstream sides of said space.

15. Charged-particle-providing means comprising a pair of ionizing electrodes, voltage-supply means connected to supply said ionizing electrodes with voltages of opposite polarities to provide positive ionization from one of said ionizing electrodes and to provide negative ionization from another, operable means including an adjustable member operative to vary the ionization produced by a first of said ionizing electrodes, and charge-detecting means operatively connected to said operable means, and causing said operable means to adjust said member in response to a charge detected by said charge-detecting means.

16. An invention in accordance with claim 15 but further characterized by said voltage-supply means comprising a circuit including an adjustable electrical current-carrying element, and said member being movable along said element.

17. Charged-particle-providing means comprising an ionizing electrode, voltage-supply means connected to said ionizing electrode to supply it with voltage for causing it to provide charged particles, charge-detecting means for detecting an electric charge provided at least in part by particles charged by said ionizing electrode, operable means including an adjustable member operative to vary the ionization provided by said ionizing electrode, and means interconnecting said charge-detecting means and said operable means to cause said charge-detecting means to initiate operation of said operable means in response to predetermined charge-detection by said charge-detection means.

18. An invention in accordance with claim 17 but further characterized by said voltage-supply means comprising a step-up transformer having a primary winding and a secondary winding, circuit means including a rectifier connecting said secondary winding to said ionizing electrode, and a power circuit means comprising a voltage regulator connected to said primary winding.

19. An invention in accordance with that of claim 18 but further characterized by a variable voltage consuming device in a first of said circuit means, and by said adjustable member being operable to vary said voltage-consuming device.

GAYLORD W. PENNEY.
GEORGE W. HEWITT.

REFERENCES CITED

The following references are of record in the file of this patent:

UNITED STATES PATENTS

| Number | Name | Date |
|---|---|---|
| 2,189,614 | Penney | Feb. 6, 1940 |
| 2,318,093 | Penney | May 4, 1943 |
| 2,397,075 | Hare et al. | Mar. 19, 1946 |
| 2,398,934 | Hare | Apr. 23, 1946 |